US010020124B2

(12) United States Patent
Hayakawa et al.

(10) Patent No.: US 10,020,124 B2
(45) Date of Patent: Jul. 10, 2018

(54) SEPARATOR FOR ELECTRIC DOUBLE LAYER CAPACITORS, AND ELECTRIC DOUBLE LAYER CAPACITOR

(71) Applicant: KURARAY CO., LTD., Kurashiki-shi (JP)

(72) Inventors: Tomohiro Hayakawa, Okayama (JP); Hiroyuki Kawai, Okayama (JP); Hideo Hayashi, Okayama (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 14/750,063

(22) Filed: Jun. 25, 2015

(65) Prior Publication Data

US 2015/0294801 A1 Oct. 15, 2015

Related U.S. Application Data

(63) Continuation of application No. PCT/JP2013/084436, filed on Dec. 24, 2013.

(30) Foreign Application Priority Data

Dec. 26, 2012 (JP) .................. 2012-283132

(51) Int. Cl.
*H01G 11/52* (2013.01)
*H01M 2/16* (2006.01)
*H01G 11/04* (2013.01)

(52) U.S. Cl.
CPC ........... *H01G 11/52* (2013.01); *H01M 2/162* (2013.01); *H01M 2/1626* (2013.01); *H01G 11/04* (2013.01); *Y02E 60/13* (2013.01)

(58) Field of Classification Search
CPC ........ H01G 11/04; H01G 11/28; H01G 11/42; H01G 11/32; H01G 11/52; H01G 11/36; H01G 11/56; H01G 11/68
See application file for complete search history.

(56) References Cited

U.S. PATENT DOCUMENTS

| | | | |
|---|---|---|---|
| 3,915,750 A | 10/1975 | Uetani et al. | |
| 4,421,834 A | 12/1983 | Zupancic | |
| 5,041,104 A | 8/1991 | Seal | |
| 5,356,572 A | 10/1994 | Takai | |
| 5,624,771 A | 4/1997 | Sano et al. | |
| 6,074,523 A | 6/2000 | Mizobuchi et al. | |
| 6,607,995 B1 | 8/2003 | Takeuchi et al. | |
| 7,170,739 B1 | 1/2007 | Arora et al. | |
| 7,510,806 B2 | 3/2009 | Yoshimura et al. | |
| 8,477,480 B2 | 7/2013 | Hayakawa et al. | |
| 8,802,271 B2 | 8/2014 | Hayakawa et al. | |
| 8,865,336 B2 | 10/2014 | Hayakawa et al. | |
| 9,005,820 B2 | 4/2015 | Sugimoto et al. | |
| 9,142,816 B2 | 9/2015 | Hayakawa et al. | |
| 2003/0096171 A1 | 5/2003 | Thrasher et al. | |
| 2004/0234863 A1 | 11/2004 | Yoshimura et al. | |
| 2006/0014080 A1* | 1/2006 | Kubo | D21H 27/00 429/255 |
| 2006/0073389 A1* | 4/2006 | Sudou | D04H 3/007 429/254 |
| 2008/0241662 A1 | 10/2008 | Kawachi et al. | |
| 2009/0214846 A1 | 8/2009 | Kalbe | |
| 2010/0080988 A1 | 4/2010 | Hayakawa et al. | |
| 2010/0310921 A1 | 12/2010 | Hayakawa et al. | |
| 2011/0081583 A1 | 4/2011 | Sugimoto et al. | |
| 2011/0206972 A1 | 8/2011 | Hashimoto et al. | |
| 2012/0164514 A1 | 6/2012 | Hayakawa et al. | |
| 2013/0149614 A1* | 6/2013 | Kubo | H01M 2/1626 429/246 |
| 2013/0183569 A1 | 7/2013 | Hayakawa et al. | |
| 2015/0079479 A1* | 3/2015 | Hayakawa | H01M 2/145 429/252 |

FOREIGN PATENT DOCUMENTS

| | | |
|---|---|---|
| CN | 1551400 A | 12/2004 |
| CN | 101573810 A | 11/2009 |
| CN | 101924242 A | 12/2010 |
| JP | 43-27546 B1 | 11/1968 |
| JP | 48-83334 A | 11/1973 |
| JP | 59-14260 A | 1/1984 |
| JP | 1-320755 A | 12/1989 |
| JP | 5-247882 A | 9/1993 |
| JP | 8-31429 A | 2/1996 |
| JP | 9-213296 A | 8/1997 |
| JP | 10-172532 | 6/1998 |
| JP | 10-223196 A | 8/1998 |

(Continued)

OTHER PUBLICATIONS

U.S. Appl. No. 14/533,563, filed Nov. 25, 2014, US2015/0079479, Hayakawa, et al.
Advisory Action dated Feb. 6, 2017, in co-pending U.S. Appl. No. 14/553,563.
Advisory Action dated Dec. 20, 2016, in co-pending U.S. Appl. No. 14/553,563.
Office Action dated Jan. 3, 2017, in corresponding Chinese Patent Application No. 201380067964.1 (with English-translation of Search Report).
Office Acton dated Sep. 19, 2016 in Chinese Patent Application No. 201380028335.8 (with partial English translation).
Notification of Reason(s) for Rejection dated Nov. 22, 2016, in corresponding Japanese Patent Application No. 2014-518434.
Office Action dated Oct. 21, 2016, in co-pending U.S. Appl. No. 14/553,563, filed Nov. 25, 2014.
Office Action dated Jul. 6, 2016 in co-pending U.S. Appl. No. 14/553,563.
Extended European Search Report dated Aug. 5, 2016 in Patent Application No. 13866727.4.

(Continued)

*Primary Examiner* — Nguyen Ha

(74) *Attorney, Agent, or Firm* — Oblon, McClelland, Maier & Neustadt, L.L.P.

(57) ABSTRACT

A separator for electric double layer capacitor comprising a fiber sheet containing 10% by mass (relative to 100% by mass of fiber sheet) of polyvinyl alcohol fibers (fibers A) having a hot water-dissolving temperature of lower than 100° C. and higher than 85° C., the separator having a density within a range of 0.25 to 0.7 g/cm³, and a thickness within a range of not less than 5 μm and less than 40 μm.

18 Claims, No Drawings

(56) References Cited

FOREIGN PATENT DOCUMENTS

| JP | 10-256088 | 9/1998 |
|---|---|---|
| JP | 10-284038 A | 10/1998 |
| JP | 3661104 B2 | 4/2005 |
| JP | 2006-004844 | 1/2006 |
| JP | 2006-229092 | 8/2006 |
| JP | 2007-208043 | 8/2007 |
| JP | 2008-269795 | 11/2008 |
| JP | 2009-123399 | 6/2009 |
| JP | WO 2011/033975 A | 3/2011 |
| JP | 4922664 B2 | 2/2012 |
| JP | 2012-054228 | 3/2012 |
| JP | WO 2012/036025 A1 | 3/2012 |
| JP | 2012-109268 A | 6/2012 |
| WO | WO 2008/075457 | 6/2008 |
| WO | WO 2013/180073 | 12/2013 |

OTHER PUBLICATIONS

Japanese Office Action dated Sep. 13, 2016 in Patent Application No. 2014-518434.
"A Versatile High Performance Polymer" Sekisui-Selvol, http://www.sekisui-sc.com/wp-content/uploads/SelvolPVOH_Brochure_EN.pdf, Product Literature, Printed Jun. 20, 2016, pp. 1-13 and Cover pages.
"Cellophane Film" TechnoClip, http://technoclip.ru/en/cellophanefilm.htm, Wayback online Sep. 30, 2011, pp. 1-2.
Notice of Allowance dated Mar. 27, 2017, in co-pending U.S. Appl. No. 14/553,563, filed Nov. 25, 2014.
Merriam Webster (https://www.merriam-webster.com/dictionary) break with Wayback machine evidence) Dec. 23, 2005.
Office Action dated Jun. 20, 2017 in Korean Patent Application No. 10-2015-7019417 (with partial English language translation).
Office Action dated Sep. 5, 2017 in Chinese Patent Application No. 201380067964.1.

* cited by examiner

US 10,020,124 B2

SEPARATOR FOR ELECTRIC DOUBLE LAYER CAPACITORS, AND ELECTRIC DOUBLE LAYER CAPACITOR

CROSS REFERENCE TO THE RELATED APPLICATION

This application is a continuation application, under 35 U.S.C. § 111(a), of international application No. PCT/JP2013/084436, filed Dec. 24, 2013, which claims priority to Japanese Patent Application No. 2012-283132 filed on Dec. 26, 2012, the entire disclosure of which is herein incorporated by reference as a part of this application.

FIELD OF THE INVENTION

The present invention relates to a separator for capacitor that is useful as a constituent material of an electric double layer capacitor, and to an electric double layer capacitor including the same separator.

Electric double layer capacitors have high capacitance of similar level as those of nickel-cadmium batteries, nickel-hydrogen batteries, and lithium ion batteries. Therefore, electric double layer capacitors have been recently used for memory backup power sources of personal computers, auxiliaries or alternatives to rechargeable batteries, in addition to conventional uses of capacitors in power smoothing or noise absorption.

Rechargeable batteries of conventional type had high capacitance, but had relatively short lifetime, and had difficulty in rapid charge-discharge. On the other hand, the electric double layer capacitors have advantageous properties as capacitors such as long lifetime and rapid charge-discharge, in addition to relatively high capacitance.

In general, an electric double layer capacitor is constituted of positive and negative electrodes, an electrolyte solution, a separator, current collectors, and others, where the separator is used for allowing passage of electrolyte solution while inhibiting electrical contact between the positive and negative electrodes. Since internal resistance of a separator increases with increasing thickness resulting in increasing length of the path between the electrodes, reduction of separator thickness by constituting the separator with extra-fine fibers is demanded.

For example, JP Laid-open Patent Publication No. 10-256088 discloses an electric double layer capacitor in which a pair of polarizing electrodes is separated by a separator, wherein the separator is prepared by producing a wet paper using cellulose as a raw material, and drying the wet paper while preserving porous structure of the wet paper.

SUMMARY OF THE INVENTION

However, according to the separator of JP Laid-open Patent Publication No. 10-256088, it is difficult to decrease both of density and thickness of the separator in the same time since the separator is substantially made only of beaten cellulose.

An object of the present invention is to provide a separator for an electric double layer capacitor, the separator having a low density, decreased thickness, and reduced electrical resistance.

Another object of the present invention is to provide a separator for an electric double layer capacitor, the separator allowing reduction of thickness while ensuring sufficient strength required for a separator for electric double layer capacitors.

Still other object of the invention is to provide a separator for an electric double layer capacitor, the separator having gas permeability (porous property, ion permeability) while ensuring sufficient strength required for a separator for an electric double layer capacitor.

The other object of the present invention is to provide a separator for an electric double layer capacitor, the separator having sufficient strength (e.g., tensile strength), thin thickness, low density, and gas permeability (porous property, ion permeability) in appropriate balance.

As a result of extensive research to solve the above-described problems, (i) the inventors focused on polyvinyl alcohol fibers (polyvinyl alcohol-based fibers) having hot water-dissolving temperature in a specific range, and found that (ii) where a fiber sheet was prepared through wet process from polyvinyl alcohol fibers having hot water-dissolving temperature higher than 85° C. and lower than 100° C., the polyvinyl alcohol fibers are in contact with each other on fiber surfaces at the crossing points of the fibers while maintaining properties as subject fibers, and that (iii) the thus obtained fiber sheet had low density, reduced thickness, and could suppress increase of resistance where the sheet was used as a separator for electric double layer capacitor. Based on the above-described findings, the inventors conducted the present invention.

A first aspect of the present invention is a separator for an electric double layer capacitor, comprising a fiber sheet (made of a material) containing polyvinyl alcohol fibers (fibers A) having a hot water-dissolving temperature of lower than 100° C. and higher than 85° C. in a proportion of not less than 10% by mass based on the 100% by mass of the fiber sheet, the separator having a density within a range of 0.25 to 0.7 g/cm³ and a thickness of not less than 5 µm and less than 40 µm.

Preferably, the fiber sheet of the above-described separator for an electric double layer capacitor further contains polyvinyl alcohol fibers (fibers B) having hot water-dissolving temperature of lower than 80° C. In this case, mass ratio of fibers A and fibers B may satisfy A/B=40/60 to 99/1.

Preferably, the fiber sheet is made of raw fibers that include the fibers A or both of the fibers A and fibers B, and further include cellulose fibers. Preferably, the cellulose fibers are beaten materials composed of organic solvent-spun cellulose fibers or natural cellulose fibers.

Preferably, the above-described separator satisfies the following conditions 1 and 2.

1. The separator has a thickness within a range of 5 to 30 µm.
2. Strength of the separator in a longitudinal direction (kg/15 mm)/thickness of the separator (µm)>0.025.

A second aspect of the present invention is an electric double layer capacitor that comprises the above-described separator for an electric double layer capacitor.

According to the present invention, since the fiber sheet constituting the separator for an electric double layer capacitor contains not less than 10% by mass (relative to the total mass of the fiber sheet) of polyvinyl alcohol fibers (fibers A) having hot water-dissolving temperature of lower than 100° C. and higher than 85° C., the fibers forming the fiber sheet are adhered to each other at the crossing points of the fibers while maintaining fiber forms. Therefore, it is possible to achieve a fiber sheet that has reduced thickness while maintaining strength property of the fibers, and also has gas permeability (ion permeability) resulting in low density and low resistance due to the presence of void space between fibers. Such a fiber sheet is specifically effective as a separator.

Further, where polyvinyl alcohol fibers (fibers B) having a hot water-dissolving temperature lower than that of the fibers A are added to the fibers A to form the sheet, it is possible to strengthen the adhesion at the crossing points of fibers by binder effect exerted by the fibers B.

Further, where cellulose fibers, specifically, beaten cellulose fibers are added to form the sheet, the addition of fibrillated fibers provides bonding in the fiber sheet by entanglement of fibers, and thereby improving flexibility of the sheet and providing shielding property of appropriate level to the sheet.

Further, where the separator according to the present invention satisfies the below-described two conditions, the fiber sheet has balanced thickness and mechanical strength.

1. The separator has a thickness within a range of 5 to 30 μm.
2. Strength of the separator in a longitudinal direction (kg/15 mm)/thickness of the separator (μm)>0.025.

According to an electric double layer capacitor equipped with the separator according to the first aspect of the present invention having the above-described properties, it is possible to decrease the thickness of the separator while decreasing the density of the separator, thereby decreasing distance between the electrodes and reducing resistance. In addition, it is possible to expect increased capacitance by increasing numbers of positive and negative electrodes by the use of thin separators.

The present invention encompasses any combinations of at least two constitutions described in claims and/or specification. Specifically, the present invention encompasses any combinations of two or more claims.

DESCRIPTION OF EMBODIMENTS

A separator for an electric double layer capacitor of the present invention comprises a fiber sheet containing 10% by mass or more (relative to 100% by mass of the fiber sheet) of polyvinyl alcohol fibers (fibers A) having a hot water-dissolving temperature of lower than 100° C. and higher than 85° C., the separator having a density within a range of 0.25 to 0.7 g/cm$^3$, and having a thickness of not less than 5 μm and less than 40 μm.

[Fiber Sheet]

In the fiber sheet constituting the separator for an electric double layer capacitor according to the present invention, polyvinyl alcohol fibers (fibers A) having a hot water-dissolving temperature of lower than 100° C. and higher than 85° C. must be blended in an amount of 10% by mass or more (preferably 15% by mass or more, more preferably 25% by mass or more). Upper limit of the amount of fibers A is not limited provided that a fiber sheet can be formed. Typically, the upper limit may be about 70% by mass (preferably, 60% by mass).

When the fiber sheet is formed by wet-forming method (sheet forming method using a paper machine or the like), where the hot water-dissolving temperature is lower than 100° C., moisture in the fibers can allow surfaces of the fibers to be adhered with each other at the crossing points of the fibers during heating and drying process, while maintaining the fiber structure so as to achieve formation of a sheet. Where the hot water-dissolving temperature is 100° C. or higher, it is difficult to form a fiber sheet since the fibers are not adhered to each other due to stable fiber surfaces during the heating and drying process. On the other hand, where the hot water-dissolving temperature is not higher than 85° C., polyvinyl alcohol constituting the fibers is completely melted or dissolved during heating and drying the wet-formed web. As a result, it is difficult to retain the structure of fiber sheet. Preferably, the fiber sheet is formed by using polyvinyl alcohol fibers having hot water-dissolving temperature of lower than 98° C. and higher than 90° C. Here, the hot water-dissolving temperature denotes a value that is measured in accordance with the method described in the below described Examples.

The present invention is characterized by forming a sheet using polyvinyl alcohol fibers (fibers A) having a hot water-dissolving temperature within a specific range. Since the polyvinyl alcohol fibers having the hot water-dissolving temperature in a specific range can adhere to each other at the crossing points by heating during forming the fiber sheet, the fibers function as binder fibers as well as functioning as subject fibers of the sheet.

[Fibers A]

In the present invention, the polyvinyl alcohol fibers having a hot water-dissolving temperature of lower than 100° C. and higher than 85° C. may be obtained from a vinyl alcohol polymer having an average degree of polymerization of 1000 to 5000, and a degree of saponification of not lower than 95% by mole, where the average degree of polymerization is a viscosity average degree of polymerization determined based on the viscosity of aqueous solution of 30° C.

Within a range that does not disturb the above-described solubility in the hot water, the vinyl alcohol polymer may be copolymerized with the other copolymer component. Based on the consideration of fiber forming ability and mechanical properties of the formed fibers, it is preferable to control the amount of copolymer component to be 20% by mole or less, preferably 10% by mole or less. Preferably, the vinyl alcohol polymer is escaped from crosslinking treatment or acetalizing treatment such as formalization (FA) or the like so as to maintain adherence between the fibers in the time of forming the fiber sheet. It is not necessary to compose the polyvinyl alcohol fibers only of the vinyl alcohol polymer, and the fibers may contain other polymer. The polyvinyl alcohol fibers may be fibers that are spun only from vinyl alcohol polymer. Alternatively, the fibers may be blend spun fibers or conjugated spun fibers (islands in a sea fiber type) with other type(s) of polymer(s) within a range in that the fibers have a predetermined hot water-dissolving temperature. In the present invention, since the polyvinyl alcohol fibers are desired to have high strength, polyvinyl alcohol fibers containing 80% by mass or more of vinyl alcohol polymer is preferred. Spinning method for forming the fibers may be any of wet method (for example, using sodium sulfate bath, an alkali bath, or an organic solvent bath), dry method, or dry-wet method. After the spinning, the fibers may be subjected to heat drawing (wet-heat drawing or dry-heat drawing), heat setting, or the like. By controlling heat draw ratio, heat setting temperature or the like, it is possible to obtain polyvinyl alcohol fibers having a hot water-dissolving temperature of lower than 100° C. and higher than 85° C.

For example, the polyvinyl alcohol fiber having a specific hot water-dissolving temperature may be available as products on the market, for example, under the name of "VN20200" manufactured by KUARAY CO., LTD.

Preferably, single fiber fineness (fineness) of the fiber is 3.3 dtex or less, more preferably 1.1 dtex or less, even more preferably 0.8 dtex or less, based on the consideration of separativity and thickness reduction. The fineness is preferably 0.01 dtex or more, more preferably 0.1 dtex or more so as to ensure paper making property and to suppress increase of internal pressure. Fiber length may be determined to appropriate value in accordance with the single fiber fineness. Based on the consideration of paper making property or the like, the fiber length is preferably from 0.5 to 10 mm, more preferably from 1 to 5 mm.

[Fibers B]

In the present invention, in order to further strengthen the adherence between the fibers and to enhance the performance of the fiber sheet, in addition to the above-described fibers A, the fiber sheet preferably contains polyvinyl alcohol fibers (fibers B: hereafter also referred to as polyvinyl alcohol binder) that have a hot water-dissolving temperature of lower than 80° C. and binder performance (ability to provide adherence between fibers A in a molten or dissolved state by heating during or after fiber sheet formation by wet forming method).

Hot water-dissolving temperature of the polyvinyl alcohol binder fiber that suits the fibers B is preferably higher than 60° C. and lower than 80° C., more preferably higher than 70° C. and lower than 80° C. As the fiber B, fibers constituted from vinyl alcohol polymer having an average degree of polymerization of ca. 500 to 300, and a degree of saponification of 80 to 99% by mole (preferably 95 to 99% by mole) may be preferably used. The polyvinyl alcohol fibers may be fibers that are spun only from vinyl alcohol polymer. Alternatively, the fibers may be conjugate spun fibers or blend spun fibers (islands in a sea fibers) with other type(s) of polymer(s) within a range in that the fibers have a predetermined hot water-dissolving temperature. It is preferable to use polyvinyl alcohol fibers containing 30% by mass or more, preferably 50% by mass or more, and more preferably 80% by mass or more of vinyl alcohol polymer so as to ensure absorbability of electrolyte solution and mechanical property.

As the polyvinyl alcohol binder fibers, polyvinyl alcohol fibers having the above-described hot water-dissolving temperature may be produced by spinning the fibers in accordance with the same manner as the above-described fibers A, and subsequently drawing and/or setting the fibers in which the heat drawing and/or heat setting is (are) carried out in a smaller degree than those of fibers A. Preferably, single fiber fineness of the fiber is ca. 0.01 to 3 dtex and the fiber length is 1 to 5 mm based on the consideration of dispersibility in water, adherence with other components, pore size or the like. For example, the polyvinyl alcohol binder fiber is provided on the market by KURARY CO., LTD. under the name of "VPB101", "VPB041" or the like.

Where the fibers B are added to the separator for electric double layer capacitor of the present invention as a binder component, the amount of fibers B is preferably contained in an amount of 3 to 20% by mass relative to total mass of the fiber sheet. Too much amount of fibers B is not preferred since pores between the subject fibers are blocked (filled), resulting in reduction of gas permeability.

Where the fibers A and fibers B are used in combination, mass ratio of the fibers A and fibers B may satisfy A/B=ca. 40/60 to 99/1, preferably ca. 45/55 to 90/10, and more preferably ca. 50/50 to 85/15.

Where the fibers A and fibers B are used in combination, the fibers A preferably have a smaller fineness than the fineness of fibers B. For example, fineness ratio of fibers A and fibers B may satisfy A/B=ca. 5/95 to 35/65, preferably ca. 10/90 to 30/70, more preferably ca. 15/85 to 25/75.

[Cellulose Fibers]

Cellulose fibers may be added to form the fiber sheet of the present invention. The cellulose fibers may be selected from organic solvent spun cellulose fibers obtained by spinning cellulose dissolved in an organic solvent such as amine oxide, regenerated cellulose fibers, natural cellulose fibers such as various wood pulps or cotton linters, and marcelized or beaten materials thereof. Specifically, beaten fibers of organic solvent spun cellulose fibers or beaten fibers of natural cellulose fibers are preferred since the presence of fibrillated fibers allows the fiber sheet to form a network structure.

For example, degree of beating shown by Canadian standard freeness is preferably ca. 0 to 130 mL, more preferably 0 to 110 mL, and further preferably 0 to 100 mL where the degree of beating is determined by a method described in the below described Examples.

In the present invention, since the entanglement of fibrillated fibers is introduced into the fiber sheet by adding the above-described cellulose fibers to the fibers containing fiber A and optionally containing fiber B, it is possible to obtain a fiber sheet having flexibility and shielding property.

Conventionally, papers consisting only of cellulose fibers have been used as separators for capacitors. Those separators included a problem in that formation of dense sheet for obtaining predetermined strength resulted in reduction of gas permeability. In the present invention, it is possible to form a separator having balanced mechanical property, thickness, gas permeability, resistance or the like, by using specific polyvinyl alcohol fibers as subject fibers constituting the separator. The properties of the separator may be improved by providing flexibility and shielding property to the sheet by further adding cellulose fibers to the sheet. Where the cellulose fibers are added to the fiber sheet, the fiber sheet preferably contains less than 70% by mass, more preferably less than 60% by mass, and more preferably less than 50% by mass of the cellulose fibers.

[Formation of Fiber Sheet]

A separator of the present invention may be formed, for example, as a wet-laid nonwoven fabric using the above-described fibers A, preferably further added with the fibers B and/or the cellulose fibers. A method for forming the wet-laid nonwoven fabric is not particularly limited. For example, it is possible to achieve designated wet-laid nonwoven fabrics effectively by using a common wet paper machine. A cylindrical net, a tanmo net (short net), and a Fourdrinier net may be used as a wire cloth. A single layer sheet may be formed by using a single wire cloth selected from the above described wire clothes. Alternatively, a fiber sheet having a plurality of layers may be formed by using a plurality of wire clothes in combination. It is preferable to form plural layered fiber sheets so as to obtain papers that are free of spot formation and have homogeneity and excellent electrical properties. Specifically, it is preferable to form two layered papers using a combination type of tanmo-cylinder paper machine. After laying the web by wet paper machine, the web is dried, for example, using a Yankee type drier or the like so as to obtain an objective separator for electric double layer capacitors. Where necessary, the heat-dried sheet may be further subjected to heat pressing or the like.

Heating for drying the sheet may be performed within a range of (TA+15) to (TA+55)° C., preferably within a range of (TA+25) to (TA+45)° C., where TA denotes the hot water-dissolving temperature of fiber A.

Preferably, conditions for heat pressing of the fiber sheet are controlled within a range that allows the fiber sheet to retain gas permeability. For example, the heat pressing may be performed at a temperature of 150 to 250° C. and a linear pressure of 75 to 150 kgf/cm.

Further, absorbability of electrolyte solution as a separator may be improved by hydrophilic treatment of the obtained sheet, for example, by surfactant treatment.

[Properties of Separator]

As a separator for electric double layer capacitors, the separator is required to have a low density within a range of 0.25 to 0.7 g/cm$^3$ so as to suppress the resistance. In addition, it is preferable that the separator has tensile strength (in a longitudinal direction of the fiber sheet) required to pass the working process to attach the separator to the electric double layer capacitor. Preferably, the separator has sufficient porosity (gas permeability) to ensure ion permeability.

Preferably, the separator may have a density within a range of 0.3 to 0.6 g/cm$^3$, more preferably 0.35 to 0.5 g/cm$^3$.

Preferably, the separator has a small thickness such that relatively large amount of electrode material can be filled in a predetermined volume. In general, strength conflicts with the gas permeability and small thickness. Since the fiber sheet according to the present invention is formed using polyvinyl alcohol fibers having a hot water-dissolving temperature of 85 to 100° C., the fibers are adhered to each other at the crossing points while maintaining the fiber structure. Therefore, as an effect of high strength property of the polyvinyl alcohol fibers, it is possible to achieve a thin fiber sheet having desired performance with small mass per unit area.

The thickness of the separator may be in the range of not less than 5 μm and less than 40 μm, preferably within a range of 5 to 30 μm, more preferably within a range of 10 to 30 μm.

The basis weight (mass per unit area) of the separator may be controlled to arbitrary value depending on the thickness of the separator. For example, the separator may have a basis weight of 5 to 20 g/m$^2$, preferably 7 to 18 g/m$^2$, more preferably 8 to 15 g/m$^2$.

For example, gas permeability of the separator may be 1.5 to 35 cc/cm$^2$/s, and preferably 2 to 30 cc/cm$^2$/s, where the gas permeability denotes a value measure in the method as described in Example.

A ratio of the tensile strength (kg/15 mm) in a longitudinal direction of the fiber sheet and the thickness (μm) of the separator preferably satisfy the below described formula. As is shown in Examples, the separator according to the present invention can satisfy the conditions shown by the below formula.

Longitudinal strength of the separator (fiber sheet)/
Thickness of the separator (μm)>0.025.

The ratio shown in the above described formula is preferably larger than 0.03.

[Electric Double Layer Capacitor]

An electric double layer capacitor that utilizes the separator according to the present invention at least comprises positive and negative electrodes, an electrolyte solution, the above-described separator, and current collectors. Where necessary, the electric double layer capacitor may further comprise other member(s) commonly used in the technical field of electric double layer capacitors. For example, the electric double layer capacitor may at least comprise: an element that is constituted of a separator, and a pair of negative and positive polarizing electrodes that are opposed to each other via the separator and form polarized electrode layer on the current collector; and a case that houses the element and an electrolyte solution. A form of the electric double layer capacitor of the present invention is not particularly limited. The electric double layer capacitor may have various forms, for example, coin type form, wound-type form, or the like.

A polarized electrode of positive electrode side and a polarized electrode of negative electrode side are each formed on a current collector composed of a metallic material, and these polarized electrodes are separated by a separator. Where DC voltage is applied to a pair of solid electrodes immersed in a solution containing electrolyte ions, negative ions are electrostatically attracted to the positively polarized electrode, and positive ions are electrostatically attracted to the negatively polarized electrode, forming the electric double layer in each of the interfaces between the electrodes and the electrolyte solution. By this constitution, charge and discharge are performed by migration of electrolyte ions in the solution and absorption and desorption of the electrolyte ions on the surfaces of the electrodes in the electric double layer capacitor.

Species of positive and negative electrodes in the capacitor, and species of electrolytes solution are not particularly limited, and may be selected from those conventionally used in electric double layer capacitors. Further, the separator of the present invention may be used in a lithium ion capacitor that comprises a positive electrode of electric double layer and a negative electrode (for example, carbonaceous material that can store lithium ions) of a lithium ion rechargeable battery. Since the principle of an electric double layer capacitor is applied in lithium ion capacitors, the category of the electric double layer capacitor in the description of the present invention may include the lithium ion capacitors.

The separator of the present invention is specifically applicable to a separator of an electric double layer capacitor that comprises: carbonaceous positive and negative electrodes; and a non-aqueous organic-based electrolyte solution (electrolyte solution in which a salt of tetraalkylammonium cations and anions such as $BF_4^-$, $PF_6^-$, $SO_3CF_3^-$, $AsF_6^-$, $N(SO_2CF_3)_2^-$, and $ClO_4^-$ is dissolved in an organic solvent such as propylene carbonate, ethylene carbonate, dimethyl carbonate, diethyl carbonate, methyl ethyl carbonate, sulfolane, and methyl sulfolane).

EXAMPLES

Practical embodiments of the present invention are explained with reference to examples. It should be noted that the present invention is not limited to these examples. The followings are explanation for measurement of physical properties in the examples.

[Hot Water-Dissolving Temperature of Polyvinyl Alcohol Fibers (° C.)]

Each test sample was prepared by attaching a spindle to a polyvinyl alcohol fiber tow of 5 cm in length in a load of 0.9 gf/500 dtex. The test sample was suspended in water of 500 cc (20° C.), and the hot water-dissolving temperature was determined as a temperature at which the fiber tow was dissolved down during heating the water at a heating rate of 1° C. per minute.

[Degree of Beating: Drainability (CSF in mL)]

Canadian standard freeness was measured in accordance with JIS P 8121 "Pulps-Determination of drainability".

[Basis Weight]

Each test sample having a dimension of 100 mm×100 mm was obtained from a specimen along the longitudinal direction. Mass of the sample was measure at moisture equilibrium state, and the measured value was converted to mass per 1 m².

[Thickness (mm) and Density (g/cm³)]

Thickness and density of each specimen were measured in accordance with JIS P 8118 "Paper and board—Determination of thickness and density".

[Tensile Strength]

Tensile strength (kg/15 mm) of each fiber sheet along the longitudinal direction was measured in accordance with JIS P8113 "Paper and board—Determination of tensile properties".

[Gas Permeability (cc/cm²/s)]

Gas permeability was measured using a fragile type testing machine in accordance with "General woven fabric testing method-Gas permeability" in section 6.27 of JIS L 1096.

[Impedance (Resistance)]

Each specimen was immersed in a solution containing 1 mole % of lithium tetrafluoroborate at a temperature of 20° C. for 30 minutes, where the solution contained $LiBF_4$ of 1 mol/L in a mixed solvent composed of ethyl carbonate (EC) and ethyl methyl carbonate (EMC) with a mixing ratio of EC:EMC=3:7 (v/v %) produced by Kishida Chemical Co., Ltd. The specimen at a state sufficiently retaining the solution (after having the solution draining off from the specimen for 30 seconds) was subjected to measurement of impedance at ambient conditions of 20° C. and 65% using an impedance measurement device (KC-547 LCR METER) manufactured by KOKUYO ELECTRIC CO., LTD.

Example 1

Three types of constituent fibers were prepared, where the first fibers (constituent fibers 1) were non-formalized polyvinyl alcohol (PVA) fibers (VN20200 manufactured by KURARAY CO., Ltd.) having a hot water-dissolving temperature of 95° C., fineness of 0.3 dtex, and fiber length of 2 mm, the second fibers (constituent fibers 2) were polyvinyl alcohol fibers (VPB101 manufactured by KURARAY CO., Ltd.) having a hot water-dissolving temperature of 72° C., fineness of 1.1 dtex, and fiber length of 3 mm, and the third fibers (constituent fibers 3) were fibrillated fibers having CSF of 10 mL that were prepared by beating solvent spun cellulose fibers (TENCEL, a registered trademark, manufactured by Lenzing AG) having fineness of 1.7 dtex and fiber length of 3 mm using a pulper and a fiberizer. A slurry was prepared by mixing the first, second, and third constituent fibers with a mixing ratio shown in Table 1. A fiber sheet was prepared by laying a web using a cylinder type paper machine, drying the wet-laid web at a temperature of 130° C. using a dryer, and pressing the dried web using a heat press device with a linear pressure of 100 kgf/cm at a temperature of 200° C. to form a sheet. Physical properties of the obtained sheet are shown in Table 2.

Examples 2, 3

Sheets were obtained in accordance with the similar manner as in Example 1 except for controlling mixing ratio of the constituent fibers 1, 2, and 3 to be values shown in Table 1. Properties of the obtained sheet are shown in Table 2.

Example 4

A slurry was prepared by mixing the constituent fibers 1, 2, and 3 similar to those of Example 1 with the same mixing ratio. In the same manner as in Example 1, fiber sheet was obtained by wet-laying a web, drying the wet-laid web using a dryer, and pressing the web using a heat press device to obtain a sheet having a basis weight of 10 g/m², a thickness of 20 μm, and a density of 0.50 g/m³, where the thickness was controlled by controlling a clearance of the heat press device. Properties of the obtained sheet are shown in Table 2.

Example 5

A slurry was prepared by mixing the constituent fibers 1, 2, and 3 similar to those of Example 1 with the same mixing ratio. In the same manner as in Example 1, fiber sheet was obtained by wet-laying a web, drying the wet-laid web using a dryer, and pressing the dried web using a heat press device to obtain a sheet having a mass per unit area of 9 g/m², a thickness of 25 μm, and a density of 0.36 g/m³, where the thickness was controlled by controlling a clearance of the heat press device. Properties of the obtained sheet are shown in Table 2.

Example 6

A sheet was prepared in accordance with the similar manner as in Example 1 except for controlling mixing ratio of the constituent fibers 1, 2, and 3 to be values shown in Table 1. Properties of the obtained sheet are shown in Table 2.

Comparative Examples 1 and 2

Sheets were prepared in accordance with the similar manner as in Example 1 except for controlling mixing ratios of the constituent fibers 1, 2, and 3 to be values shown in Table 1. Properties of the obtained sheets are shown in Table 2.

Comparative Example 3

A slurry was prepared by mixing the constituent fibers 1, 2, and 3 similar to those of Example 1 with the same mixing ratio. In the same manner as in Example 1, fiber sheet was obtained by wet-laying a web, drying the wet-laid web using a dryer, and pressing the dried web using a heat press device to obtain a sheet having a mass per unit area of 11 g/m², a thickness of 13 μm, and a density of 0.85 g/m³, where the thickness was controlled by controlling a clearance of the heat press device. Properties of the obtained sheet are shown in Table 2.

Comparative Example 4

Polyvinyl alcohol (PVA) fibers (VN30200 manufactured by KURARAY CO., LTD.) having a hot water-dissolving temperature higher than 100° C. was used as an alternative to constituent fibers 1 of Example 1, and fibrillated fibers (CSF 150 mL) prepared by beating solvent spun cellulose fibers (TENCEL, a registered trademark, manufactured by Lenzing AG) having fineness of 1.7 dtex and fiber length of 3 mm using a disk refiner were used as an alternative to constituent fibers 3 of Example 1. Except for the use of these alternative fibers and their mixing ratio with the constituent fibers 2 as shown in Table 1, a sheet was obtained in the similar manner as in Example 1. Properties of the obtained sheet are shown in Table 2.

Comparative Example 5

A sheet was prepared in accordance with the similar manner as in Example 1 except for using fibrillated fibers (CSF 150 mL) prepared by beating solvent spun cellulose fibers (TENCEL, a registered trademark, manufactured by Lenzing AG) having fineness of 1.7 dtex and fiber length of 3 mm using a disk refiner as an alternative to constituent fibers 3 of Example 1. Properties of the obtained sheets are shown in Table 2.

Comparative Example 6

A sheet was prepared in accordance with the similar manner as in Example 1 except for using polyvinyl alcohol (PVA) based fibers (VN30200 manufactured by KURARAY CO., LTD.) having a hot water-dissolving temperature higher than 100° C. as an alternative to constituent fibers 1 of Example 1. Properties of the obtained sheets are shown in Table 2.

Specific constitutions of the constituent fibers of the sheets of Examples 1 to 6 and Comparative Examples 1 to 6 are shown in Table 1, and properties of each sheet (tensile strength, gas permeability, resistance, a ratio of tensile strength/thickness) are shown in Table 2.

TABLE 1

|  |  | Example 1 | Example 2 | Example 3 | Example 4 | Example 5 | Example 6 | Comp. 1 | Comp. 2 | Comp. 3 | Comp. 4 | Comp. 5 | Comp. 6 |
|---|---|---|---|---|---|---|---|---|---|---|---|---|---|
| Constituent fiber 1 | | | | | | | | | | | | | |
| Polymer | | PVA | PVA | PVA | PVA | PVA | PVA | PVA | PVA | PVA | PVA | PVA | PVA |
| Dissolving temperature | ° C. | 95 | 95 | 95 | 95 | 95 | 95 | 95 | 95 | 95 | over 100 | 95 | over 100 |
| Fineness | dtex | 0.3 | 0.3 | 0.3 | 0.3 | 0.3 | 0.3 | 0.3 | 0.3 | 0.3 | 0.3 | 0.3 | 0.3 |
| Fiber length | mm | 2 | 2 | 2 | 2 | 2 | 2 | 2 | 2 | 2 | 2 | 2 | 2 |
| Content | % | 30 | 20 | 50 | 30 | 30 | 60 | 0 | 5 | 30 | 26 | 26 | 30 |
| Constituent fiber 2 | | | | | | | | | | | | | |
| Polymer | | PVA | PVA | PVA | PVA | PVA | PVA | PVA | PVA | PVA | PVA | PVA | PVA |
| Dissolving temperature | ° C. | 72 | 72 | 72 | 72 | 72 | 72 | 72 | 72 | 72 | 72 | 72 | 72 |
| Fineness | dtex | 1.1 | 1.1 | 1.1 | 1.1 | 1.1 | 1.1 | 1.1 | 1.1 | 1.1 | 1.1 | 1.1 | 1.1 |
| Fiber length | mm | 3 | 3 | 3 | 3 | 3 | 3 | 3 | 3 | 3 | 3 | 3 | 3 |
| Content | % | 20 | 20 | 20 | 20 | 20 | 20 | 20 | 20 | 20 | 15 | 15 | 20 |
| Constituent fiber 3 | | | | | | | | | | | | | |
| Polymer | | Cellulose | Cellulose | Cellulose | Cellulose | Cellulose | Cellulose | Cellulose | Cellulose | Cellulose | Cellulose | Cellulose | Cellulose |
| Fineness | dtex | 1.7 | 1.7 | 1.7 | 1.7 | 1.7 | 1.7 | 1.7 | 1.7 | 1.7 | 1.7 | 1.7 | 1.7 |
| Fiber length | mm | 3 | 3 | 3 | 3 | 3 | 3 | 3 | 3 | 3 | 3 | 3 | 3 |
| Degree of beating | ml | 10 | 10 | 10 | 10 | 10 | 10 | 10 | 10 | 10 | 150 | 150 | 10 |
| Content | % | 50 | 60 | 30 | 50 | 50 | 20 | 85 | 75 | 50 | 59 | 59 | 50 |

Comp.: Comparative Example;
Dissolving temperature: Hot water-dissolving temperature

TABLE 2

|  | Basis weight g/m² | Thickness μm | Density g/cm³ | Tensile strength kg/15 mm | Gas permeability cc/cm²/sec | Resistance Ω | Strength/ thickness >0.025 |
|---|---|---|---|---|---|---|---|
| Example 1 | 11 | 25 | 0.44 | 1.0 | 3.8 | 1.9 | 0.040 |
| Example 2 | 11 | 25 | 0.44 | 0.8 | 2.4 | 2.2 | 0.032 |
| Example 3 | 11 | 25 | 0.44 | 1.7 | 13.8 | 1.5 | 0.068 |
| Example 4 | 10 | 20 | 0.50 | 0.9 | 5.9 | 2.6 | 0.045 |
| Example 5 | 9 | 25 | 0.36 | 1.0 | 16.1 | 1.1 | 0.040 |
| Example 6 | 11 | 25 | 0.44 | 1.9 | 17.4 | 1.0 | 0.076 |
| Comp. 1 | 11 | 25 | 0.44 | 0.5 | 2.1 | 2.4 | 0.019 |
| Comp. 2 | 11 | 25 | 0.44 | 0.6 | 1.7 | 4.6 | 0.022 |
| Comp. 3 | 11 | 13 | 0.85 | 0.9 | 3.8 | 4.4 | 0.069 |
| Comp. 4 | 11 | 25 | 0.44 | 0.4 | 19.3 | 0.9 | 0.016 |
| Comp. 5 | 34 | 104 | 0.33 | 3.8 | 5.2 | 7.6 | 0.037 |
| Comp. 6 | 11 | 25 | 0.44 | 0.6 | 4.1 | 1.8 | 0.024 |

(1) According to the sheets formed by blending cellulose fibers (constituent fibers 3) and polyvinyl alcohol binder fibers (constituent fibers 2) to polyvinyl alcohol fibers (constituent fibers 1) having a hot water-dissolving temperature of 95° C., it is possible to obtain sheets (separators) having excellent strength per thickness, excellent gas permeability, and also having reduced electric resistance even when the sheets have thin thickness and low density (Examples 1 and 2).

(2) Strength and gas permeability of the sheet are further enhanced and electric resistance of the sheet is further reduced by increasing the blending ratio of constituent fibers 1 (Examples 3 and 6).

(3) It is possible to maintain properties required for a separator even when the density of the sheet is increased from that of Example 1, provided that the density is controlled in a predetermined range (Example 4).

(4) It is possible to reduce electric resistance while maintaining strength property when the density of the sheet is decreased from that of Example 1 (Example 5).

(5) Where the sheet does not contain constituent fibers 1 (Comparative 1) or contains reduced amount of constituent fibers 1 (Comparative Example 2), or where the constituent fibers 1 are replaced by alternative fibers having excessively high hot water-dissolving temperature (Comparative Examples 4 and 6), the sheets show inferior strength and strength/thickness ratio.

(6) Where the sheet has high density, it is difficult to reduce the resistance by decreasing a thickness of the sheet (Comparative Example 3).

(7) Where the sheet has excessively large thickness, it is difficult to reduce the electric resistance of the sheet even when the density of the sheet is controlled in a predetermined range (Comparative Example 5).

INDUSTRIAL APPLICABILITY

According to the separator for electric double layer capacitor of the present invention, it is possible to achieve reduction of thickness and density of separator. Since electric double layer capacitors having such separators have improved performance, the separator has industrial applicability.

In the above-described explanation, while practical embodiments of the present invention are explained with reference to examples, the specification provides basis of various variations and modifications that are obvious for persons of ordinary skill in the art. Therefore, those variations and modifications are regarded to be within the range of the invention determined by the scope of claims.

What is claimed is:

1. A separator for an electric double layer capacitor, comprising:
a fiber sheet containing polyvinyl alcohol fibers A and polyvinyl alcohol fibers B;
wherein:
the fibers A have a hot water-dissolving temperature of lower than 100° C. and higher than 85° C.;
the fibers B have a hot water-dissolving temperature of lower than 80° C.;
the fiber sheet contains at least 10% by mass of the fibers A relative to 100% by mass of the fiber sheet;
the separator has a density within a range of 0.25 to 0.7 g/cm$^3$;
the separator has a thickness within a range of not less than 5 μm and less than 40 μm;
the fibers A have a single fiber fineness smaller than a single fiber fineness of the fibers B; and
a ratio of the single fiber fineness of the fibers A to the single fiber fineness of the fibers B is from 5/95 to 35/65.

2. The separator for an electric double layer capacitor according to claim 1, wherein a mass ratio between the fibers A and the fibers B satisfies A/B=40/60 to 99/1.

3. The separator for an electric double layer capacitor according to claim 1, wherein the fiber sheet further contains cellulose fibers.

4. The separator for an electric double layer capacitor according to claim 3, wherein the cellulose fibers are beaten fibers of organic solvent spun cellulose fibers or natural cellulose fibers.

5. The separator for an electric double layer capacitor according to claim 1, wherein:
a thickness of the separator is within a range of 5 to 30 μm; and
a strength of the separator in a longitudinal direction (kg/15 mm)/thickness of the separator (μm) is larger than 0.025.

6. An electric double layer capacitor comprising the separator for an electric double layer capacitor according to claim 1.

7. The separator for electric double layer capacitor according to claim 1, wherein:
the fiber sheet contains 30% by mass or more of fibers A relative to 100% by mass of the fiber sheet; and
a mass ratio between the fibers A and the fibers B satisfies A/B=40/60 to 85/15.

8. The separator for electric double layer capacitor according to claim 1, wherein the fiber sheet contains 50% by mass or more of fibers A relative to 100% by mass of the fiber sheet.

9. The separator for electric double layer capacitor according to claim 1, wherein the fibers A have a single fiber fineness of from 0.01 dtex to 0.8 dtex and a fiber length of from 1 m to 5 mm.

10. The separator for electric double layer capacitor according to claim 1, wherein the fibers A have a single fiber fineness of from 0.1 dtex to 0.8 dtex and a fiber length of from 0.5 mm to 10 mm.

11. The separator for electric double layer capacitor according to claim 1, wherein the fibers A are obtained by spinning only from a vinyl alcohol polymer.

12. The separator for electric double layer capacitor according to claim 1, wherein the fibers A are blend spun fibers or conjugated spun islands-in-the-sea fibers.

13. The separator for electric double layer capacitor according to claim 1, wherein the fibers A are obtained by spinning a vinyl alcohol polymer having an average degree of polymerization of 1,000 to 5,000 and a degree of saponification of not lower than 95% by mole, where the average degree of polymerization is a viscosity average degree of polymerization determined based on a viscosity of an aqueous solution at 30° C.

14. The separator for electric double layer capacitor according to claim 1, wherein the fibers B have a single fiber fineness of from 0.01 dtex to 3 dtex and a fiber length of from 1 mm to 5 mm.

15. The separator for electric double layer capacitor according to claim 1, wherein the fibers B are obtained by spinning only from a vinyl alcohol polymer.

16. The separator for electric double layer capacitor according to claim 1, wherein the fibers B are blend spun fibers or conjugated spun islands-in-the-sea fibers.

17. The separator for electric double layer capacitor according to claim 1, wherein the fibers B are obtained by spinning a vinyl alcohol polymer having an average degree of polymerization of 300 to 500 and a degree of saponification of 80 to 99% by mole, where the average degree of polymerization is a viscosity average degree of polymerization determined based on a viscosity of an aqueous solution at 30° C.

18. A separator for an electric double layer capacitor, comprising:
- a fiber sheet comprising polyvinyl alcohol fibers A, polyvinyl alcohol fibers B, and cellulose fibers;

wherein:
- the fibers A have a hot water-dissolving temperature of lower than 100° C. and higher than 85° C.;
- the fibers A have a single fiber fineness of from 0.01 dtex to 0.8 dtex and a fiber length of from 1 mm to 5 mm;
- the fibers B have a hot water-dissolving temperature of lower than 80° C.;
- the fibers B have a single fiber fineness of from 0.01 dtex to 3 dtex and a fiber length of from 1 mm to 5 mm;
- the fiber sheet contains at least 10% by mass of the fibers A relative to 100% by mass of the fiber sheet;
- the fibers A have a single fiber fineness smaller than a single fiber fineness of the fibers B; and
- a ratio of the single fiber fineness of the fibers A to the single fiber fineness of the fibers B is from 5/95 to 35/65;
- the separator has a density within a range of 0.25 to 0.7 g/cm$^3$;
- the separator has a thickness within a range of 5 to 30 μm; and
- a strength of the separator in a longitudinal direction (kg/15 mm)/thickness of the separator (μm) is larger than 0.025.

* * * * *